July 8, 1969        M. E. HUDSON        3,453,892

SPIN TIME RECORDER

Filed April 15, 1966        Sheet 1 of 6

INVENTOR.
MARVIN E. HUDSON
BY
ATTORNEYS.

July 8, 1969  M. E. HUDSON  3,453,892
SPIN TIME RECORDER

Filed April 15, 1966  Sheet 2 of 6

INVENTOR.
MARVIN E. HUDSON
BY Alden D. Redfield
Charles M. Hogan
ATTORNEYS.

INVENTOR.
MARVIN E. HUDSON
ATTORNEYS.

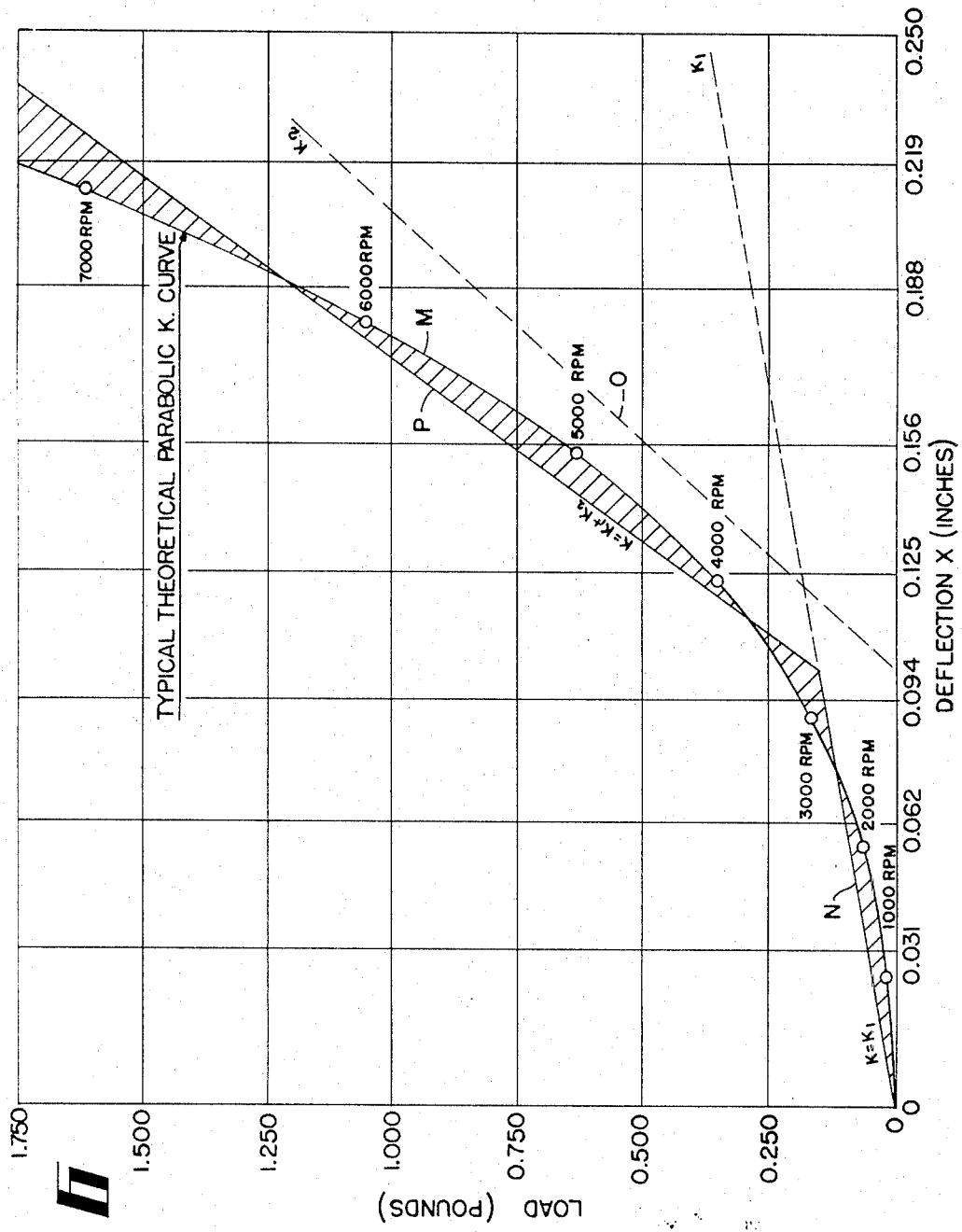

INVENTOR.
MARVIN E. HUDSON
ATTORNEYS.

HIGH OR LOW RPM
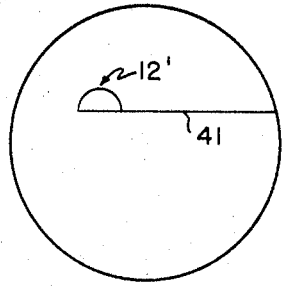
HIGH OR LOW RPM WITH ASSIST SPRING
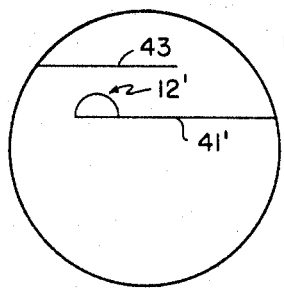
Fig 8
A B
HIGH AND LOW RPM
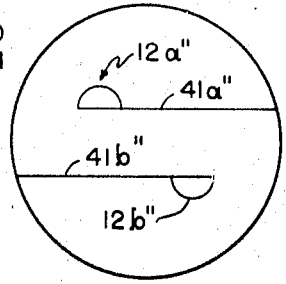
HIGH AND LOW RPM WITH ASSIST SPRING
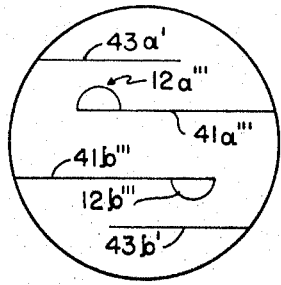
Fig 9
A B
HIGH OR LOW RPM WITH PRE-COMPUTED CURVATURE FOR SUPPORT
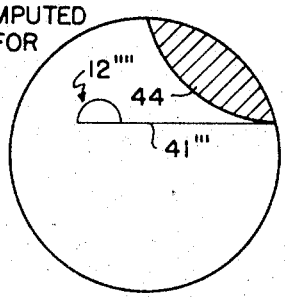
HIGH OR LOW RPM WITH PRE-COMPUTED CURVATURE FOR SUPPORT
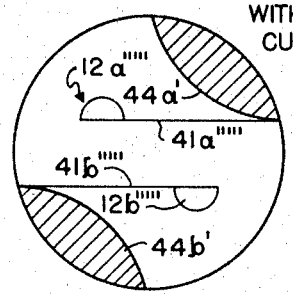
Fig 10
A B
INVENTOR.
MARVIN E. HUDSON
BY Alden W. Redfield
Charles M. Hogan
ATTORNEYS.

United States Patent Office 3,453,892
Patented July 8, 1969

3,453,892
SPIN TIME RECORDER
Marvin E. Hudson, Richmond, Ind., assignor to Avco Corporation, Richmond, Ind., a corporation of Delaware
Filed Apr. 15, 1966, Ser. No. 542,834
Int. Cl. G01p 15/00
U.S. Cl. 73—489         1 Claim

ABSTRACT OF THE DISCLOSURE

This is a device useful in ordnance. It is a recording instrument for establishing and maintaining a continuous record of angular velocity over a specified time interval. A housing is adapted to be spun, as in the making of laboratory measurements or as installed in a grenade. A mass is elastically mounted by spring means so that it is deflected laterally with respect to the axis of the housing, as a function of angular velocity. This mass carries a stylus which is always in contact with the rotatably mounted disc of a recording device. The disc is driven at a constant speed by means including a verge located on the axis of the housing. The verge is engaged by releasable locking means which normally arrests the driving means but is retracted in response to setback forces to permit the driving means to start.

---

This invention arose out of the performance of Contract DA-28-017-ORD-5226(A) so that the Government of the United States has a royalty free license to practice the invention or to cause it to be practiced by and for the Government, throughout the world.

The present invention relates to instrumentation for testing the performance of rotating bodies with varying rotational speed. It is of utility when it is desired to measure and record the rotational (spin) velocity during a specified, definite time interval. A specific application concerns the test of air-launched rotating grenades.

The principal objects of the invention are to provide an instrument of the character described which:

(1) Measures angular velocity as plotted against time throughout the duration of spin of a rotating body such as an air-launched grenade in flight.

(2) Is adapted for the making of laboratory measurements or for installation in a rotating body, such as a grenade, to provide recorded measurements in the laboratory or under actual conditions in the field with respect to a fixed or free spin axis reference.

(3) Is readily adaptable in the proposed embodiment as a spinning object which simulates, in the laboratory or under actual air-launched conditions, a specific rotating body or device such as a grenade.

(4) When incorporated into a rotating body in free flight will measure the variations in angular velocity caused by variations in parameters such as weight, moment of inertia, center of gravity, and aerodynamic forces including the effect of air density.

(5) Can be readily calibrated in the laboratory.

(6) Provides a permanent record of spin history, thus affording design data useful in designing devices (such as arming and fuzing) which utilize spin energy.

(7) Provides terminal velocity data for the stable portion of the flight, which can readily be reproduced in a wind tunnel and will disclose lift and drag as well as other aerodynamic forces during this phase of the flight.

(8) Provides means of measuring significant flight intervals such as the time from launch to burst, time from burst to deployment of a drag device, or the time from burst or drag deployment to ground impact.

(9) Will provide a measurement of a nutating body when the sensing mechanism is placed off the goemetric center of the primary spin axis.

For a better understanding of the present invention, together with other and further objects, advantages, and capabilities thereof, reference is made to the following description of the appended drawings, in which there are illustrated a preferred form and alternate forms of spin recorder in accordance with the invention.

Figure 5:
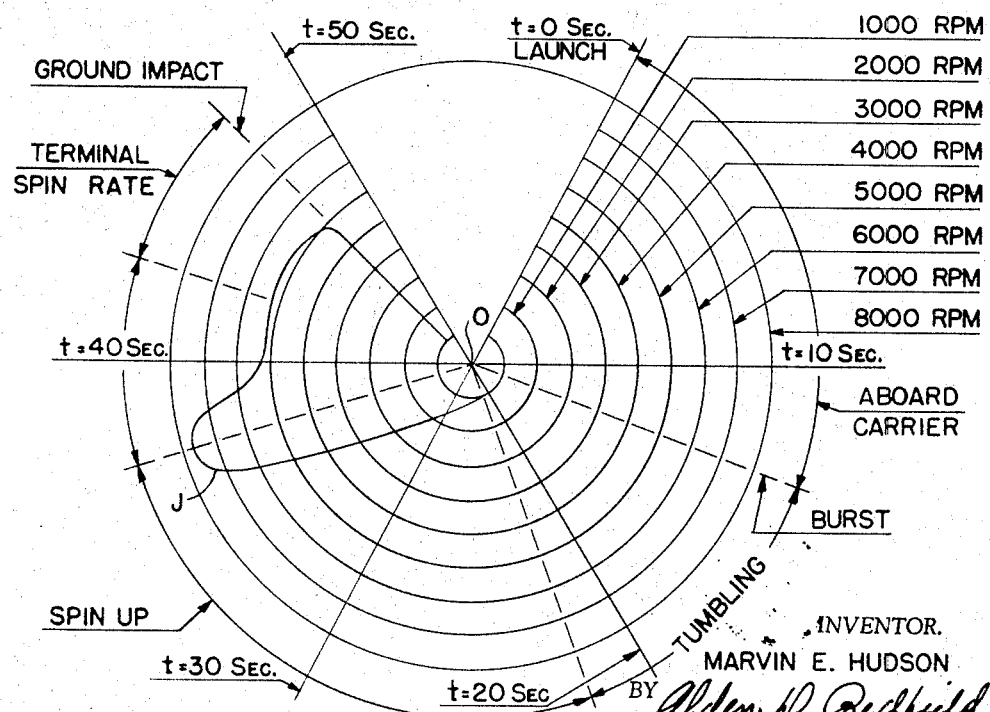
Figure 7A:
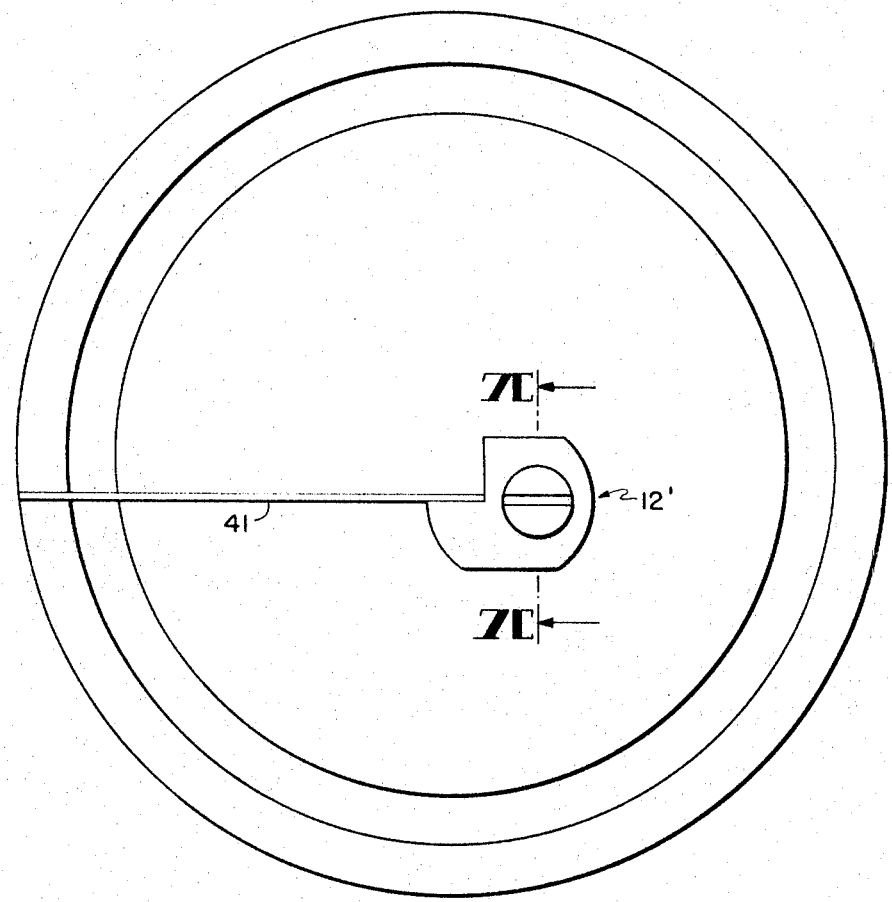
Figure 7B:
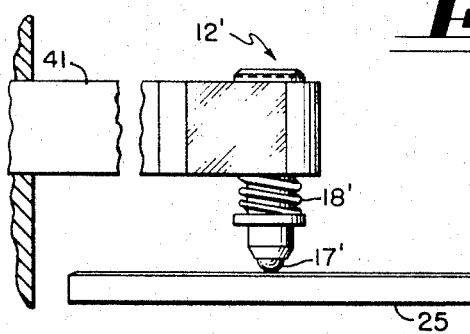
Figure 7C:
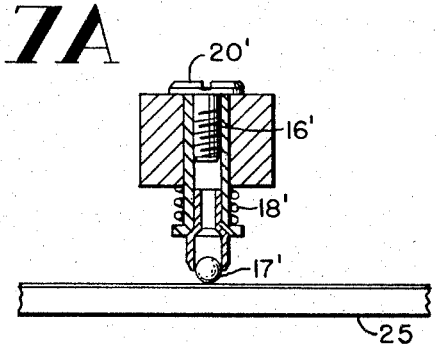

FIG. 5 comprises a comparison of said calibration curves with a typical graph of spin history as measured in an actual flight test of a rotating body;

FIG. 6 comprises a set of curves used in explaining the calibration curves of the instrumentation;

FIGS. 7A, 7B, and 7C are fragmentary views of an alternate embodiment of recording mechanism in accordance with the invention, and are, respectively, top, side, and longitudinal sectional views of a cantilever version of sensor in accordance with the invention;

FIGS. 8A, 9A and 10A are skeleton outlines of other modified forms of sensor in accordance with the invention; and FIGS. 8B, 9B, and 10B are similar views, but incorporating an assist spring, a pair of such springs, or beam supports, respectively.

The detailed description is prefaced by inviting attention to the fact that the invention makes practical the tracing or engraving of a permanent record of spin forces and the like throughout the flight of a rotating body— for example, a grenade. Prior to the present invention, the requisite design data with respect to spin were premised on aerodynamic postulates, wind tunnel measurements, and highly theoretical mathematics reposing partially on hypothesis. The present invention provides these data positively and empirically, and therefore frees the art from the complex of a priori assumptions and ex posteriori trial-and-error techniques from which uncertain answers as to missile spin data were heretofore derived.

Figure 1:
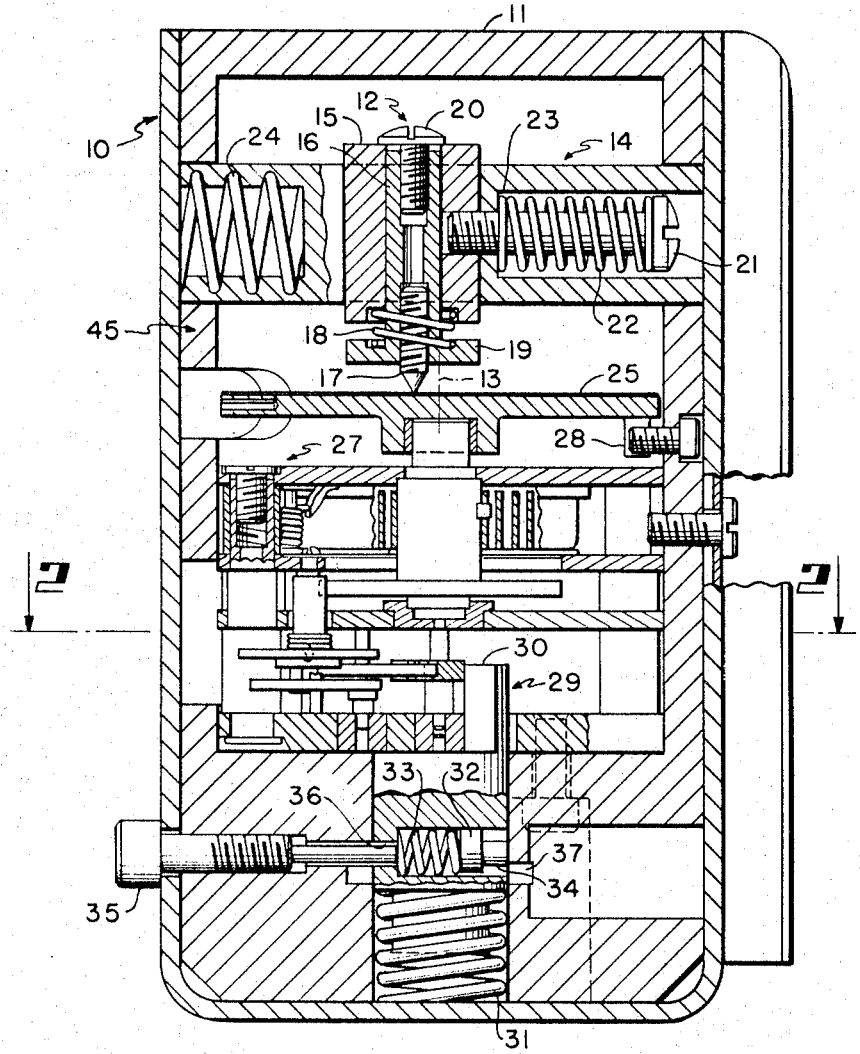
FIG. 1 is an axial sectional view through the preferred embodiment of spin recorder, showing it in the "safe" condition.
Figure 2:
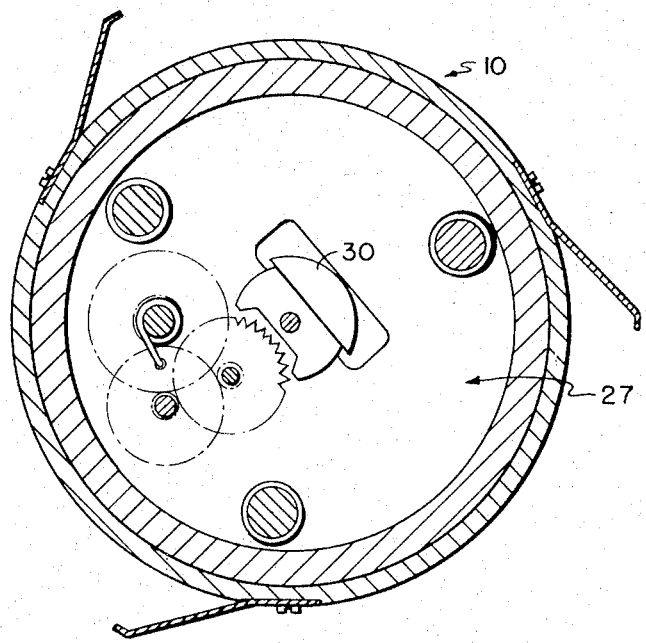
FIG. 2 is a sectional view taken along line 2—2 of FIG. 1.

The FIG. 1 embodiment consists generally of three mechanisms integrated together to form the recorder instrument. The three mechanisms involved are the recording mechanism, the timing mechanism, and the initiation mechanism. These three mechanisms are disposed in a suitable generally cylindrical housing comprising a body 10 and a cap 11. The mainspring and mass system in that recording mechanism is referred to herein by the abbreviated expression "sensor."

Figure 3:
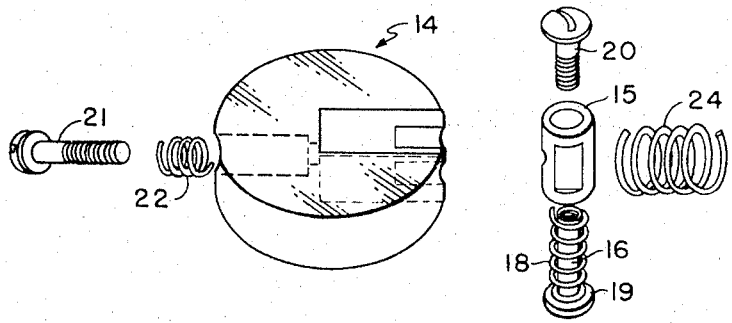
FIG. 3 is an exploded fragmentary view of the principal parts of the sensor included in the FIG. 1 embodiment.

The sensor (FIGS. 1 and 3) comprises a mass 12 which is so placed that its centroid is located off the axis of rotation 13 of the instrument. This mass 12 is positioned for slidable linear displacement in a scriber housing 14. That is, the scriber housing or guide member 14 is formed with a slide to permit deflection of the mass. This slide terminates at its inner end in a wall that has a back bearing surface 23 and a front surface against which the mass abuts, prior to deflection.

The mass 12 comprises the principal slider member 15 and an insert 16 having a spring-retaining portion 19, a stylus needle 17, a needle spring 18, and screws 20 and 21. It will be understood by those of ordinary skill in the recording art that the stylus 17 is mounted on the element 16 by conventional means, and as the element 16 is radially displaced or deflected, the stylus 17 is likewise radially displaced. The screw 21 is threaded transversely into a tap on the element 15, and a spring 22 is concentrically placed about the shank of the screw and positioned between its head and a flanged bearing surface 23 formed in the scribing housing 14.

The recording mechanism may be considered as an equivalent spring-mass system. The mass 12 is contained in the housing 14 such that it can move only radially laterally linearly outwardly with respect to the designated instrument spin axis. Any angular velocity or change of angular velocity about the spin axis experienced by the instrument will cause a corresponding movement in the mass due to the spin-generated centrifugal force. The amount of radial movement and spin range of the mass is controlled by the spring parameters chosen for springs 22 and 24.

The needle 17 forms a part of the mass and has the function of scratching a trace of its radial movement upon a recording disc described below. Needle spring 18 keeps a positive force on the needle 17, insuring a positive trace when the instrument is spinning. Screw 20 allows adjustment of the force value desired between the recording disc surface and the needle 17.

The recording disc 25 forms an integral part of the timing mechanism and rotates relative to the spin of the instrument and the needle 17 at a predetermined angular velocity and time interval. This movement establishes a time base against which the spin is measured. When the recording disc is set in motion, any spin induced upon the instrument will result in a radial movement of the mass 12. A plot of the resultant force action on the mass 12 is traced upon the recording disc against the time base, establishing an angular velocity vs. time curve for the instrument during the time interval selected.

Figure 4:
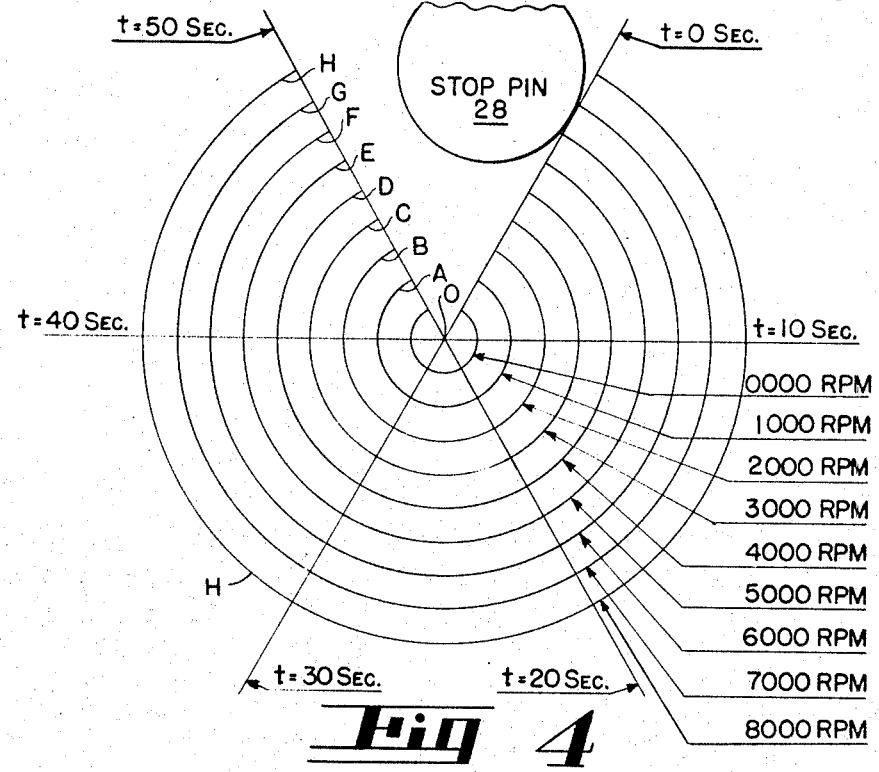
FIG. 4 is a typical set of calibration curves pertinent to the FIG. 1 embodiment.

To accurately interpret the desired trace, it is necessary to calibrate the instrument. Calibration is effected by rotating the instrument about its spin axis at several fixed predetermined constant angular velocities while the recording disc is being rotated through the desired time interval. The result is a series of concentric curves equidistant from the center of rotation (FIG. 4). The "in flight" or laboratory-induced trace can then be precisely measured relative to the calibration curves (per FIG. 5).

Further discussing the curves, those marked A–H in FIG. 4 show by way of example the graphs of centrifugal force acting on the mass 12 during the respective constant spins from 1000 r.p.m. to 8000 r.p.m., on a system of polar coordinates, the forces being graphed as moduli against instants of time in the form of polar angles.

Now, also by way of example, FIG. 5 includes not only the calibration curves, taken under constant spin and fixed conditions, but it includes further an additional curve J which is the actual centrifugal force-time history of a rotating body either in actual flight or under accurately simulated flight conditions. It will, of course, be obvious to those versed in the art that the spin of the grenade increases as flight is initiated and decreases at the termination of flight. Centrifugal force being a function of angular velocity or spin, the curve J behaves likewise, and it is considerably more significant in its showing in that it furnishes a record of the centrifugal forces acting on the mass 12 throughout the flight.

On a graph of Cartesian coordinates with force expressed in pounds as ordinates and deflection of a spring system in inches as abscissae, the ideal spring constant for the system would be variable and a parabolic curve M, as illustrated in FIG. 6. This may be shown as follows:

The design concept of a sensing device is based on a sliding mechanism of mass $m$ offset from the center of spin of the rotating body by a distance $r$. As the body begins to rotate, the sliding mechanism will move out radially due to the centrifugal force $mr\omega^2$ being opposed by a helical spring which exerts a force $kx$ of the same magnitude.

If friction is neglected, it is found that $kx = mr\omega^2$. In other words, if a linear relationship between $\omega$ and $x$ were desired, $k$ must be variable and represent a parabolic curve. In order to approximate this theoretical spring constant over the deflection range of the mass chosen for operation, I prefer to employ two springs 22 and 24 (FIG. 1) having the individual constants illustrated in the curves N and O of FIG. 6, the constant of the two springs arranged in parallel combination taken together being as shown in curve P, which approximates a parabola and is entirely satisfactory for practical purposes.

In the design of a practical embodiment of the invention, it was found that the radial distance available for recording purposes was approximately one-fourth inch, to give an example, and that design was intended to record values as high as 8000 revolutions per minute (r.p.m.). Rearranging the equation mentioned above, $k = mr\omega^2/x$. In the specific design mentioned, it was desired that the quantity $x$ vary approximately 0.032 inch for each 1000 r.p.m. Values of $k$ were calculated that represented the ideal spring for this incremental deflection of the stylus. Helical springs generate linear relationships between load and deflection within the elastic limit, and in the specific embodiment here shown two helical springs were placed in parallel. The springs were so placed that the rate $k_1$ of one spring, followed by the combined rates of both springs, $k_1$ and $k_2$, approximates a theoretical parabolic curve, as shown in FIG. 6.

The deflection range and the spin range may be varied to suit different designs by simply changing the springs 22 and/or 24. It will be understood that the spring and mass parameters will be so chosen as to cause spring-mass resonances out of the range of measurements utilized.

Referring again to FIG. 1, there is illustrated a suitable timing and driving mechanism 27. Constant speed timers and drives for achieving a given rotational speed of the recording discs are pe se common in the art: they utilize the energy of a wound mainspring for driving purposes, developing a torque which is here applied to the rotating disc 25. Such a mechanism commonly comprises an escapement train of the runaway type, within the range of reasonably constant torque having an oscillating verge. This verge is here located on the spin axis of the instrument in order to prevent lock-up of the escapement when spin is induced. The timing and driving mechanism is simply a mechanical time base. The operation is such that the disc 25 rotates through slightly less than one revolution (about 350 degrees) and is arrested by a stop-pin 28. The entire timing mechanism is disposed within the housing 45.

Referring now to the initiation mechanism in FIG. 1, it comprises a generally axially oriented set-back pin 29 having a projecting end 30 normally located against the verge of the escapement. The set-back pin 29 is biased into this position by a compression spring 31. The portion 30 of the set-back pin prevents the verge from oscillating. A transversely oriented lock-out pin 32 is slidably mounted within a cylindrical formation in pin 29 and is formed with a head portion against which there bears a compression spring 33. The lock-out pin is further formed with a shank portion 34. A safety-pin 35 projects through a port 36 formed in the pin 29. Preparatory to installation of the instrument in a missile, the safety-pin is unscrewed and removed in order to free the set-back pin 29. Prior to retraction, the function of the safety-pin is to prevent any movement of pin 29, and therefore any premature actuation of the timing mechanism.

The discussion now assumes that the pin 35 has been withdrawn, the instrument installed in the missile body, and launching is occurring. Acceleration of the missile causes pin 29 to be displaced rearwardly, and, when shank 34 registers with the annular groove 37, the lock-out pin 32 is displaced outwardly. By this time projection 30 has cleared the verge and the engagement of the lock-out element 32 assures that the pin 29 cannot again prevent operation of the timing mechanism. Upon clearance of portion 30 of the set-pin 29 from the verge, the timing and driving mechanism initiates rotation of the recording disc 25.

Reference is now made to the embodiment illustrated in FIGS. 7A, 7B, and 7C. It has been shown that the FIG. 1 embodiment utilizes a sliding mass. In the low-spin range inherent frictional forces which it generates require rigorous measures to assure accurate data traces. The alternate embodiment of the FIG. 7 group utilizes the same time mechanism and recording disc 25, but substitutes a principal sensing means in the form of a cantilever system. That is, the helical springs 22 and 24 are replaced or simulated by a flexible cantilever beam 41, and the sliding mass 12 is replaced by a concentrated mass 12' at the end of the cantilever beam. The details of the construction of the stylus or ball scribe 17', spring 18', insert 16', and stylus adjustment screw 20' are generally similar to the similarly numbered unprimed elements of FIG. 1. The mass group in this alternate system incorporates a ball or Teflon scribe 17' in lieu of the more conventional steel stylus 17. The ball scribe is of particular utility with pressure-sensitive paper. As before, the center of mass of the scriber system of FIGS. 7A, 7B, and 7C is placed off the spin axis of the instrument.

The major technical difference in the two scriber designs is the influence exerted by friction forces on the scriber 17 or 17' (i.e., friction of a sliding member vs. friction of a ball point). The cantilever system, when used with a ball scribe or other tracing instrument on pressure-sensitive paper, has very low inherent friction. At the least suggestion of spin, the mass will deflect the cantilevered spring, thus leaving a trace of the motion. In comparison, when an equal amount of energy, at low spin, is directed to the slider type recording mechanism, a higher level of energy must be used to overcome the static and sliding friction. At higher spin levels friction forces become relatively small and irrelevant in both systems.

The system of FIGS. 7A, 7B, and 7C is symbolically illustrated in FIG. 8A. The FIG. 8A embodiment may, if desired, be supplemented by a cantilever-type spring 43, per FIG. 8B, the free end of which is deflected to impose a restraint on the deflection of the cantilever system 41', 12' in order to vary its calibration range and radial movement as in the FIG. 1 embodiment.

An additional variation of the cantilevered scribing system incorporates the use of two cantilevered scribing mechanisms 12a'', and 41a'', and 12b'', 41b'' (FIG. 9A) with different deflection rates so that two distinct or overlapping spin ranges can be recorded simultaneously on the same record (e.g., high and low range of an object).

The FIG. 9A system likewise can be supplemented with cantilever-type springs such as 43a' and 43b'. That is, in order to insure that the calibration curves generated by the cantilever-type embodiments are equidistant from each other over the selected spin range, I utilize a cantilever spring such as 43 in FIG. 8B or a pair of cantilever springs such as 43a' and 43b' (FIG. 9B), and these cantilever springs can be utilized either singly or doubly.

An equivalent method of accomplishing the same result is to utilize a curved beam support such as 44 in FIG. 10A, or 44a', 44b' in FIG. 10B in order to control the deflection of the cantilever beam or beams.

The significance of the primes and multiple primes is that the elements involved are generally functionally alike, varying only as to particular design parameters involved. The significance of the suffixes a and b is simply to indicate duplication of elements. The community of reference numerals is indicative of functional equivalence.

While there have been shown and described what are at present considered to be preferred embodiments of the invention, it will be understood by those skilled in the art that various modifications and changes may be made therein without departing from the scope of the invention as defined in the appended claim.

I claim:
1. In ordnance, a recording instrument for establishing and maintaining a continuous record of measurements of angular velocity over a specified time interval comprising:

a housing adapted to be spun;
a recording device including a rotatably mounted disc;
a mass which responds to changes in angular velocity to be deflected laterally with respect to the axis of the housing;
a stylus carried by the mass;
a guide member formed with a slide to permit deflection of said mass, said slide terminating in an inner wall,
a first compression spring disposed on the side of the mass away from which the mass deflects,
a screw having a head and extending through said first spring and wall to engage said mass, so that the first spring is compressed against said wall as the mass deflects,
a second compression spring on the side of the spring toward which the mass deflects, said springs being wound with different inherent spring rates in order to extend the range of measurements,
the housing being formed so that the stylus is always in contact with the disc;
means for driving the disc at constant speed including a verge located on the axis of the housing; and
releasable locking means which normally engages the verge to arrest the driving means but is retracted in response to setback to permit the driving means to operate.

References Cited

UNITED STATES PATENTS

| | | | |
|---|---|---|---|
| 1,855,703 | 4/1932 | Cloud | 73—511 |
| 2,868,611 | 1/1959 | Carleton | 73—492 |
| 3,129,301 | 4/1964 | Saphra | 73—537 |
| 3,220,008 | 11/1965 | Weisman et al. | 346—7 |
| 3,366,966 | 1/1968 | Clark | 346—7 |
| 2,984,184 | 5/1961 | Cetre | 102—84 |
| 3,345,947 | 10/1967 | Combourieux | 102—84 |

FOREIGN PATENTS 384,976  1/1933  Great Britain.

RICHARD C. QUEISSER, *Primary Examiner.*
ROBERT S. SALZMAN, *Assistant Examiner.*